March 3, 1964 V. POLLASCHEK 3,123,272

ADJUSTABLE TAPE GUIDE ELEMENTS

Filed Oct. 12, 1962 3 Sheets-Sheet 1

INVENTOR
VIKTOR POLLASCHEK
BY
Frank R. Jifari
AGENT

March 3, 1964 V. POLLASCHEK 3,123,272

ADJUSTABLE TAPE GUIDE ELEMENTS

Filed Oct. 12, 1962 3 Sheets-Sheet 2

INVENTOR
VIKTOR POLLASCHEK
BY
AGENT

INVENTOR
VIKTOR POLLASCHEK
BY Frank R. Jeifari
AGENT

United States Patent Office 3,123,272

Patented Mar. 3, 1964

3,123,272

ADJUSTABLE TAPE GUIDE ELEMENTS

Viktor Pollaschek, Vienna, Austria, assignor to North American Philips Company, Inc., New York, N.Y., a corporation of Delaware Filed Oct. 12, 1962, Ser. No. 230,061
Claims priority, application Austria Oct. 26, 1961
12 Claims. (Cl. 226—197)

This invention relates to magnetic recording and reproducing devices and in particular to such devices in which a tape-shaped record carrier is led over the periphery of a stationary drum. They may be especially useful in the magnetic recording and reproduction of video signals.

In such devices, scanning is usually accomplished by means of fixed or rotary magnetic heads arranged within the drum.

Generally, the record carrier takes the form of a single-turn helix on the drum, and the position of the record carrier on the drum is accurately determined by position guides provided on the drum; as an example, these guides may be in the form of pins.

It is generally desirable that the tape-shaped carrier engage the drum through an angle as close as possible to 360 degrees and it is also desirable that the tape portions entering and leaving the drum surface in the position on the drum determined by the position guides do so in a manner such that recording and reproduction will be performed most faithfully. For this purpose, feeding guides are used for feeding the carrier to the drum. A minimum distance between the feeding guides affords many advantages, for example, with regard to the guiding of the tape or the adjustment of the feeding guides in their position relative to the drum. However, if an optimum minimum distance is attained and if the feeding guides are fixedly arranged on the drum, then, as might be expected, great difficulties are experienced in applying the carrier to the drum. In addition thereto, also the correct adjustment of the feeding guides, which are fixedly arranged on the drum, entails considerable difficulties.

Among the objects of the invention are the following:

To provide means to facilitate the winding of the tape about the stationary drum in a device as mentioned above, which means is simple and effective in structure and in operation;

To provide means for moving the guiding elements away from the drum so that the tape may be more easily placed therearound, and then for moving said elements back to the drum; and To provide means which will maintain the optimum minimum distance mentioned above and which will also allow the carrier to be applied to the drum with relative ease.

According to the invention and in furtherance of the above-mentioned and further objects, there are provided, for leading the record carrier to and from the drum, two mutually parallel cylindrical feeding guides placed on a supporting member which is journalled so that it may be urged against the drum. The feeding guides may be pins between which the record carrier is led. The supporting member is maintained on a bearing and is movable thereon transversely to the axes of the feeding guides in any direction and is tiltable towards the axis of the drum. If the supporting member is urged against the drum, the feeding guides are arranged at approximately equal distances from the drum and lie approximately parallel to the periphery thereof. Two adjusting pins are also provided which project radially from the drum and have their projecting ends formed by circular cones; these cones have a base diameter larger than the spacing between the feeding guides and are placed so that the peaks of the cones lie between the feeding guides, the latter being urged against the drum by means of the supporting member. The adjusting pins are preferably displaceable in a radial direction. One adjusting pin may be advantageously arranged in an eccentric journalled so as to be rotatable and clampable in the periphery of the drum.

In order that the invention may be readily carried into effect, it will now be described more fully, by way of example, with reference to the accompanying diagrammatic drawings, in which.

Figure 1:
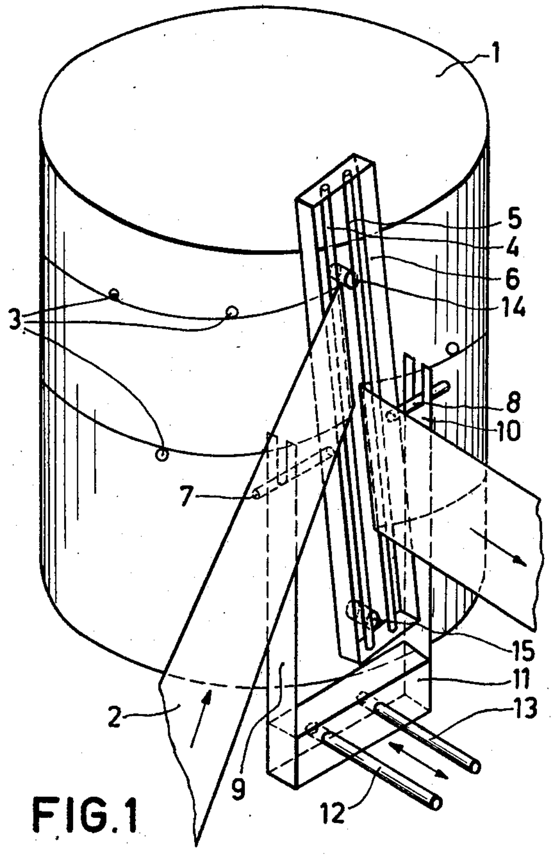
FIG. 1 is an isometric view of an arrangement according to the invention.

Referring now to FIG. 1, the reference numeral 1 designates the stationary drum over whose periphery a tape-shaped record carrier 2 is led in the form of a single-turn helix by means of position guides 3, for example, pins, provided thereon. The leading of the tape to and from the drum is effected by feeding guides shown as cylindrical pins 4 and 5, the tape in each case being led between the two pins. The pins 4 and 5 are rigidly secured in parallel to each other in a support 6 which may be in the form of a frame, for example. The support 6 is suspended with lateral play by means of two shafts 7 and 8 which are journalled in two forks 9 and 10. The forks 9 and 10 are connected by a junction piece 11 to form a unit which may be displaced along auxiliary guides 12 and 13 in the manner of a slide.

Placed in the periphery of the drum beyond reach of the tape are two pins 14 and 15 which have shapes terminating in cones projecting from the drum; the peripheral surfaces of the cones are engaged at the left and at the right, respectively, by the adjacent faces of the pins 4 and 5 when the whole unit is pushed along the auxiliary guides 12 and 13 against the drum. It is thus assured that, upon sliding the unit against the drum, each of the pins 4 and 5 always automatically assumes the same position relative to the periphery of the drum. Additionally, as shown in the example of FIG. 1, the support 6 is not only tiltable in the forks 9 and 10 about the shafts 7 and 8 towards and away from the axis of the drum, but can also move within certain limits in any direction transversely to the axes of the pins 4 and 5. Any other form of bearing which allows of such movements of the support may be employed.

Since the conical ends of the pins 14, 15 projecting from the periphery of the drum determine the distance of the pins 4 and 5 from the periphery of the drum, the pins 14 and 15 are arranged in the drum preferably to be adjustable in a radial direction, for example, by forming them as threaded pins.

Figures 2, 3, 6, 7:
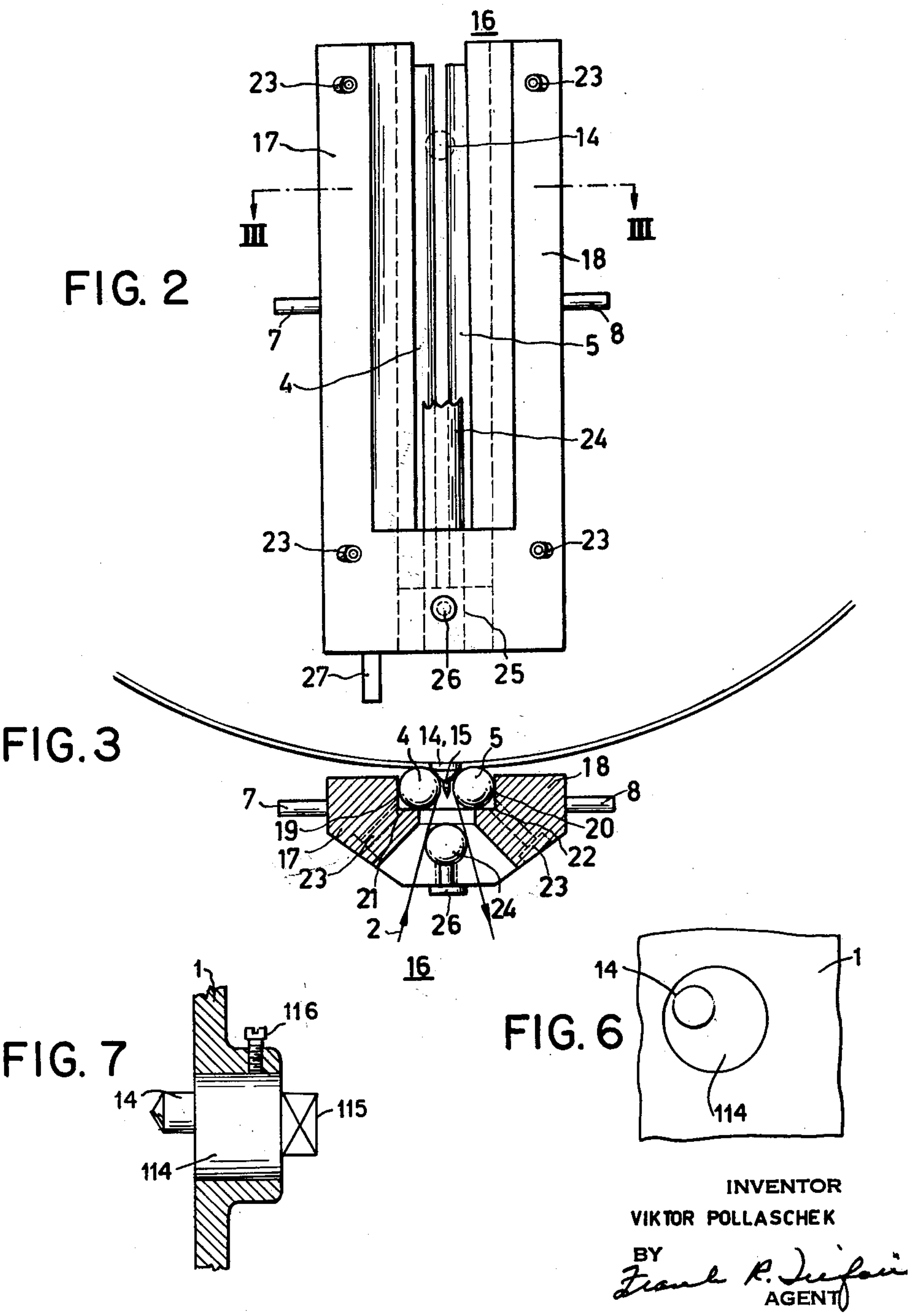
FIG. 2 is a side view of a supporting member for the feeding guides.
FIG. 3 is a sectional view, taken along the line III—III of FIG. 2.
FIGS. 6 and 7 show details of a configuration for an eccentric mounting for one of the adjusting pins.

To permit accurate adjustment of the angle made by the line connecting the two cone peaks of the pins 14 and 15 and the generatrix of the periphery of the drum, one adjusting pin may advantageously be fitted in an eccentric journalled to be rotatable and clampable in the periphery of the drum. Due to the scale of FIGURE 1, the arrangement of the eccentric is shown in FIGURES 6 and 7, wherein the adjusting pin 14 is shown as fitted in an eccentric 114 journalled to be rotatable by turning knob 115 and to be clampable by means of screw 116 in the periphery of drum 1.

If the tape 2 is to be placed around the periphery of the drum in the form of a helix, the pins 14 and 15 are preferably not provided on a generatrix of the periphery of the drum but, as shown in FIG. 1, so that the line connecting the peaks of the cones is at an acute angle to the generatrix of the drum. Thus, the feeding guides 4 and 5 also occupy the required inclined positions relative to the generatrix of the drum as soon as the support 6 is urged against the drum. In such a case it is also advantageous for the support 6 to be itself inclined, for example, by choosing the notches in the forks 9 and 10 of different depths, also as shown in FIG. 1.

From the description above, it can be seen that the tape 2 may be easily placed in position around the periphery of the drum by simply sliding the junction piece 11 away from the drum along auxiliary guides 12 and 13 and then winding the tape in the appropriate directions around the pins 14 and 15. Subsequently, the junction piece 11 is slid toward the drum, thus urging the support 6 and pins 4 and 5 against the drum.

In the design of the arrangement according to the invention as described above, it is assured that the guiding elements 4 and 5 not only always have the same positions in operation, but also lie close to the periphery of the drum so that the tape portions after being wound around the pins, immediately lie on the drum, thus resulting in a very quiet and smooth running of the tape. Since the guiding elements or pins 4 and 5 may be lifted from the drum for laying the tape in position, the latter manipulation is simple and effective.

The support 6 is shown somewhat diagrammatically in FIGURE 1. A more detailed showing of one embodiment of the manner in which the support 6 may be constructed is shown in FIGURES 2 and 3, FIGURE 2 being a side view of the supporting member and FIG. 3 being a sectional view, taken along the line III—III of FIG. 2. Reference numeral 16 of FIG. 2 designates generally the supporting frame (corresponding to support 6 of FIG. 1) which is open at its top portion and which has the guiding elements or pins 4 and 5 fitted on two legs 17 and 18. For this purpose, the legs 17 and 18 have recesses 19 and 20 with parallel sides 21 and 22. The pins 4 and 5 are accommodated in said recesses and pulled inwards by means of threaded bolts screwed into the pins through bores 23 in the legs 17 and 18. On the transverse side of the frame 16 and on the sides of the pins 4 and 5 remote from the drum 1 and parallel therewith, another pin 24 is provided over the whole region occupied by the tape portions proceeding to and from the drum and serves to separate said tape portions. It may be inserted, for example, into a bore 25 in the frame 16 and fixed in position by a screw 26. The supporting frame 16 for the pins 4 and 5 must itself be somewhat tiltable in its bearing in any direction. It is preferable for this tilting movement to be limited, for which purpose use may be made of an extension 27, as will be explained further hereinafter in connection with the description of FIGURES 4 and 5.

Figure 4:
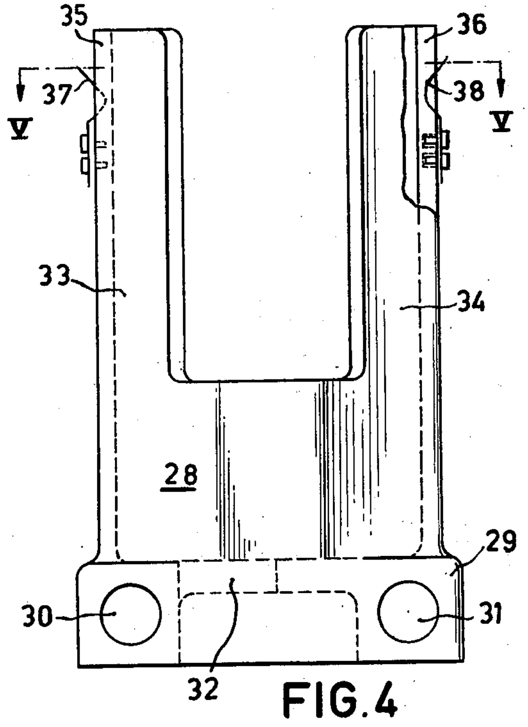
FIG. 4 shows a plan view and FIG. 5 shows a sectional view, taken along the line V—V of FIG. 4, of a bearing for the supporting member shown in FIG. 2.
Figure 5:
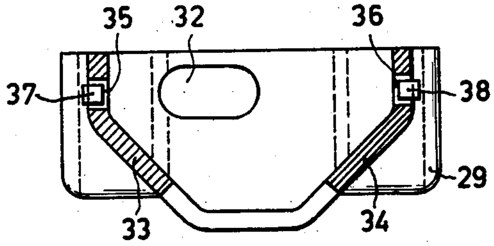

A simple and advantageous embodiment of the bearing for supporting frame 16 is shown in FIGS. 4 and 5. A U-shaped part 28 contains two bores 30 and 31 in its transverse portion 29, enabling it to be journalled in the manner of a slide on two guides (12 and 13 in FIG. 1), After the supporting frame 16 has been placed in position, an aperture 32 accommodates the extension 27 and limits the tilting movement of the frame 16. The legs 33 and 34 of the U-shaped part are provided at the top with notches 35 and 36 for forming two forks, the depths of the notches being chosen approximately in accordance with the inclined position which the frame 16 has to occupy to match the position of the conical pins 14 and 15 (FIGS. 1, 2 and 3). Springs 37 and 38 are provided to maintain the shafts 7 and 8 of the frame 16 in the notches 35 and 36 with a certain clearance.

It is not intended that the invention be limited to the specific embodiments shown and described, since it will be apparent to those skilled in the art that many forms of the invention are possible in accordance with the principles described herein and within the scope of the appended claims.

What I claim is:

1. Apparatus for recording and/or reproducing information on a record carrier comprising: a stationary drum over the periphery of which a tape-shaped record carrier is adapted to be led, a supporting member mounted adjacent to the drum, two mutually parallel feeding guides fitted on said supporting member, the record carrier being led to and from the periphery of the drum around said feeding guides, said supporting member being movable transversely to the axes of said feeding guides and being tiltable towards the axis of the drum, the feeding guides in the position of the supporting member closest to the drum being substantially at the same distance from the drum and lying substantially parallel to the periphery thereof, and means coacting with said supporting member and said feeding guides for limiting and directing the placement of said supporting member and feeding guides close to the surface of the drum.

2. Apparatus for recording and/or reproducing information on a record carrier comprising: a stationary drum over the periphery of which a tape-shaped record carrier is adapted to be led, a supporting member mounted adjament to the drum, two mutually parallel cylindrical feeding guides rigidly fitted on said supporting member, the record carrier being led to and from the periphery of the drum around said feeding guides, said supporting member being movable transversely to the axes of said feeding guides and being tiltable towards the axis of the drum, the feeding elements in the position of the supporting member closest to the drum being substantially at the same distance from the drum and lying substantially parallel to the periphery thereof, and a plurality of adjusting pins attached to said drum and projecting radially therefrom, said feeding guides being urged against said adjusting pins when the supporting member is moved toward the surface of the drum.

3. Apparatus for recording and/or reproducing information on a record carrier comprising: a stationary drum over the periphery of which a tape-shaped record carrier is adapted to be led, a supporting member mounted adjacent to the drum, two mutually parallel cylindrical feeding guides fitted on said supporting member and spaced apart thereon, the record carrier being led to and from the periphery of the drum around said feeding guides, said supporting member being movable transversely to the axes of said feeding guides and being tiltable towards the axis of the drum, the feeding elements in the position of the supporting member closest to the drum being substantially at the same distance from the drum and lying substantially parallel to the periphery thereof, and a plurality of adjusting pins attached to said drum and projecting radially therefrom, the projecting ends of said pins being formed by circular cones having a base diameter larger than the spacing between the feeding guides, said feeding guides being urged against said adjusting pins when the supporting member is moved toward the surface of the drum.

4. A device as claimed in claim 3, wherein said adjusting pins are displaceable in a radial direction, said displacement thereby making adjustable the distance between the feeding guides and the drum surface.

5. A device as claimed in claim 3, wherein one adjusting pin is arranged in an eccentric journalled to be rotatable in the periphery of the drum.

6. A device as claimed in claim 2, further comprising a third guide, said third guide being rigidly fitted on said supporting member parallel to said two mutually parallel feeding guides and positioned on the side of said two guides remote from the drum, said third guide serving to separate the tape portions proceeding to and from the drum.

7. A device as claimed in claim 3, further comprising a third guide, said third guide being rigidly fitted on said supporting member parallel to said two mutually parallel feeding guides and positioned on the side of said two guides remote from the drum, said third guide serving to separate the tape portions proceeding to and from the drum.

8. A device as claimed in claim 3, wherein two adjusting pins are used and the line connecting the peaks of the cores of the two adjusting pins is at an acute angle to the generatrix of the periphery of the drum.

9. Apparatus for recording and/or reproducing information on a record carrier comprising: a stationary drum over the periphery of which a tape-shaped record carrier is adapted to be led, a supporting member mounted adjacent to the drum, two mutually parallel feeding guides rigidly fitted on said supporting member, the record carrier being led to and from the periphery of the drum around said feeding guides, said supporting member being movable transversely to the axes of said feeding guides and being tiltable towards the axis of the drum, a junction piece having two parallel upstanding forks therein forming a bearing, the supporting member having attached thereto shaft means having an axis extending parallel to the plane through the axes of the feeding guides and at right angles thereto, said shaft means resting in said forks, the feeding elements in the position of the supporting member closest to the drum being substantially at the same distance from the drum and lying substantially parallel to the periphery thereof, and a plurality of adjusting pins attached to said drum and projecting radially therefrom, said feeding guides being urged against said adjusting pins when the supporting member is moved toward the surface of the drum.

10. Apparatus for recording and/or reproducing information on a record carrier comprising: a stationary drum over the periphery of which a tape-shaped record carrier is adapted to be led, a supporting member mounted adjacent to the drum, two mutually parallel cylindrical feeding guides fitted on said supporting member and spaced apart thereon, the record carrier being led to and from the periphery of the drum around said feeding guides, said supporting member being movable transversely to the axes of said feeding guides and being tiltable towards the axis of the drum, a junction piece having two parallel upstanding forks therein forming a bearing, the supporting member having attached thereto shaft means having an axis extending parallel to the plane through the axes of the feeding guides and at right angles thereto, said shaft means resting in said forks, the feeding elements in the position of the supporting member closest to the drum being substantially at the same distance from the drum and lying substantially parallel to the periphery thereof, and a plurality of adjusting pins attached to said drum and projecting radially therefrom, the projecting ends of said pins being formed by circular cones having a base diameter larger than the spacing between the feeding guides, said feeding guides being urged against said adjusting pins when the supporting member is moved toward the surface of the drum.

11. Apparatus as set forth in claim 9, further comprising a plurality of guiding elements positioned through said junction piece, the latter being slidable toward and away from the drum on said guiding elements.

12. Apparatus as set forth in claim 10, further comprising a plurality of guiding elements positioned through said junction piece, the latter being slidable toward and away from the drum on said guiding elements.

References Cited in the file of this patent

UNITED STATES PATENTS

| | | |
|---|---|---|
| 1,374,196 | Getches et al. | Apr. 12, 1921 |
| 2,919,314 | Holt | Dec. 29, 1959 |

FOREIGN PATENTS

| | | |
|---|---|---|
| 833,278 | Great Britain | Apr. 21, 1960 |